Feb. 16, 1971  W. P. BAERMANN ET AL  3,562,925
TRAINING MANIKIN FOR TEACHING AND PRACTICING
EXTERNAL CARDIAC COMPRESSION
Filed March 3, 1969  3 Sheets-Sheet 1
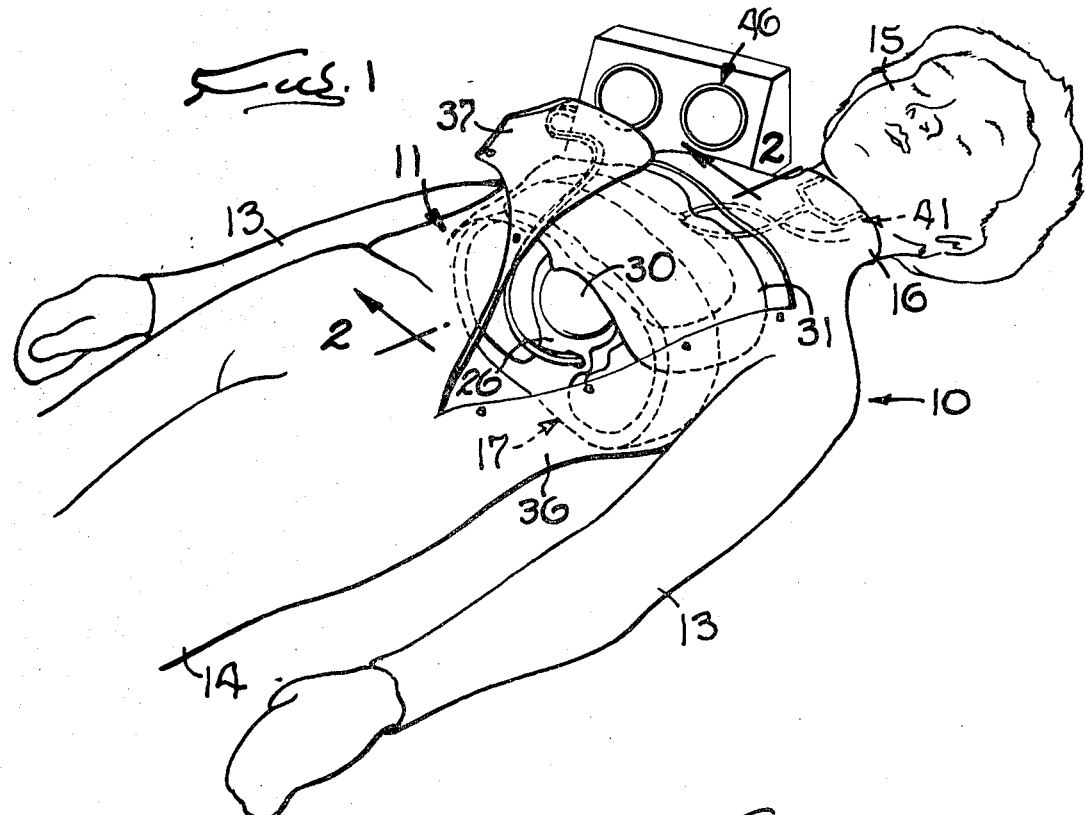
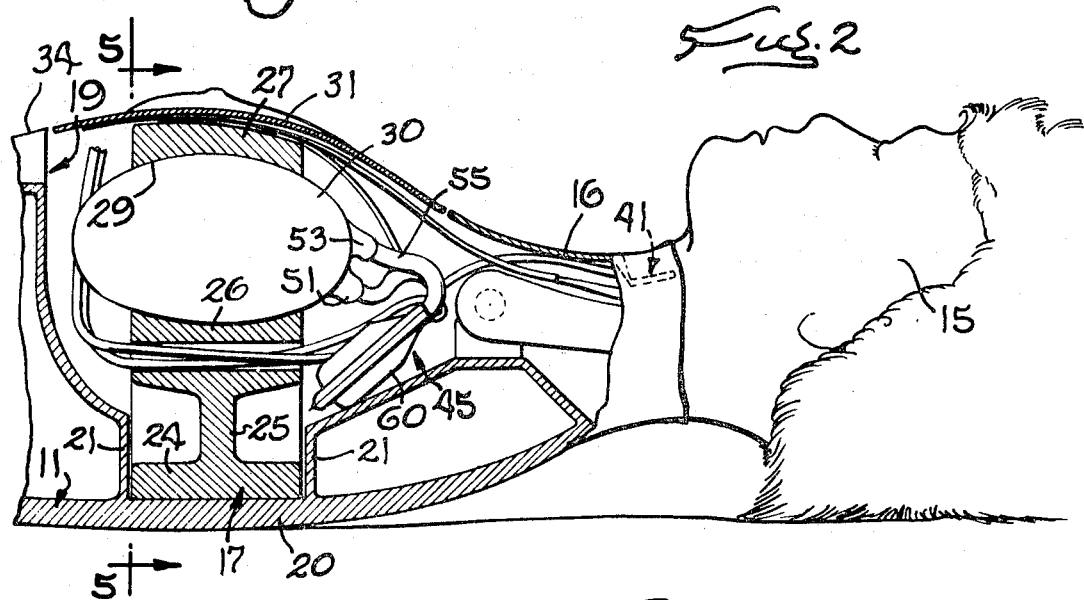
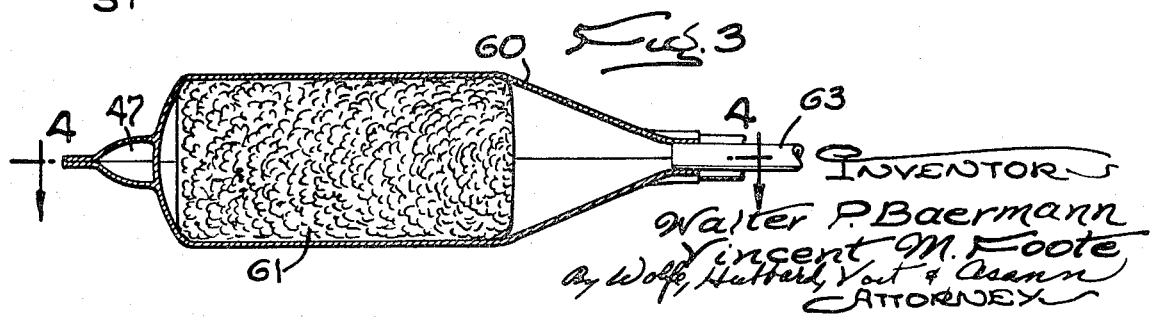
INVENTORS
Walter P. Baermann
Vincent M. Foote
By Wolfe, Hubbard, Voit & Osann
ATTORNEY Feb. 16, 1971 W. P. BAERMANN ET AL 3,562,925
TRAINING MANIKIN FOR TEACHING AND PRACTICING
EXTERNAL CARDIAC COMPRESSION
Filed March 3, 1969 3 Sheets-Sheet 2
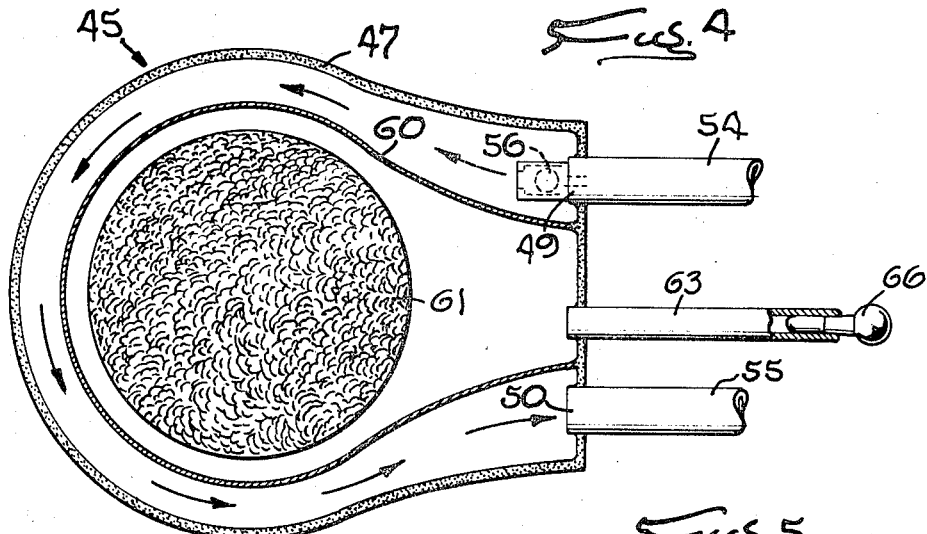
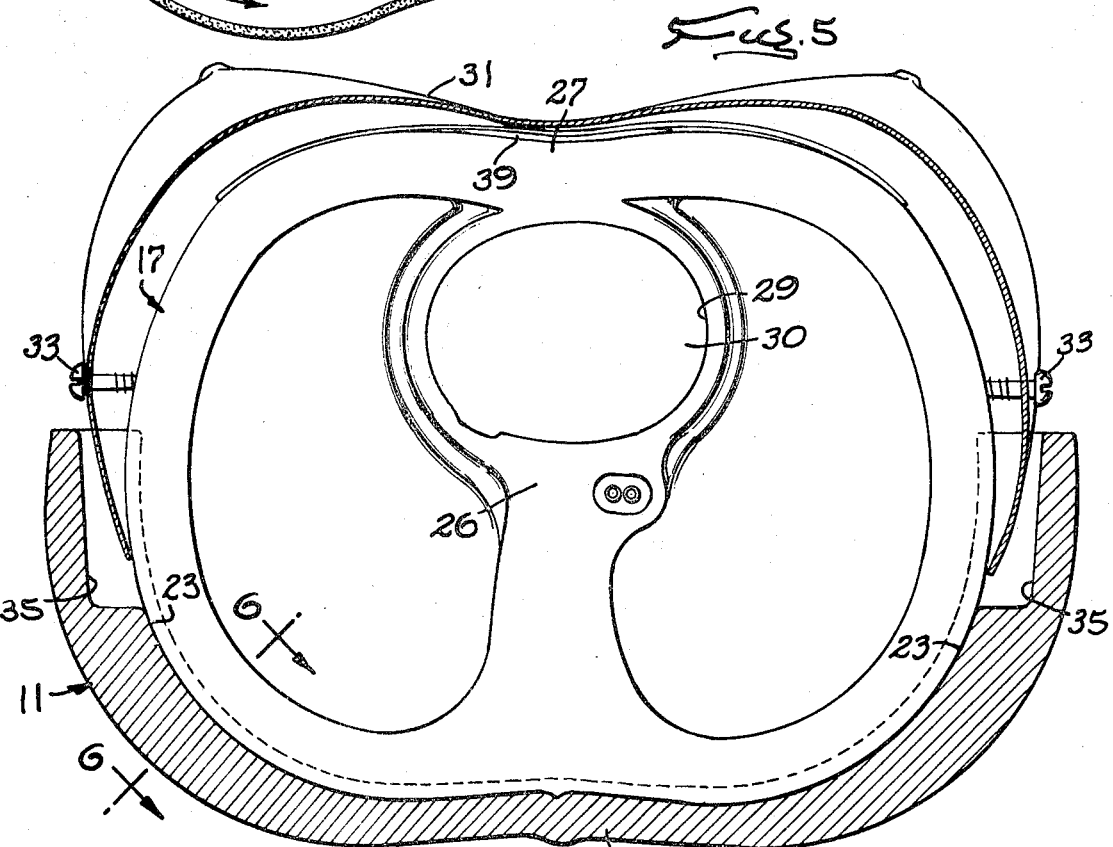
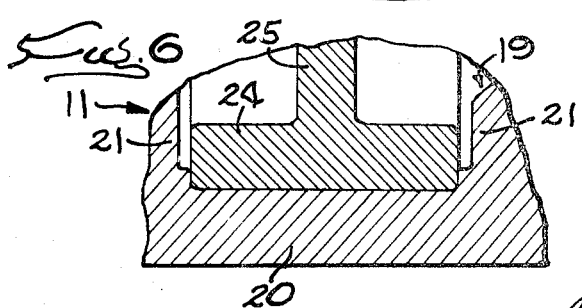
INVENTORS
Walter P. Baermann
Vincent M. Foote
By Wolfe, Hubbard, Voit & Osann
ATTORNEYS

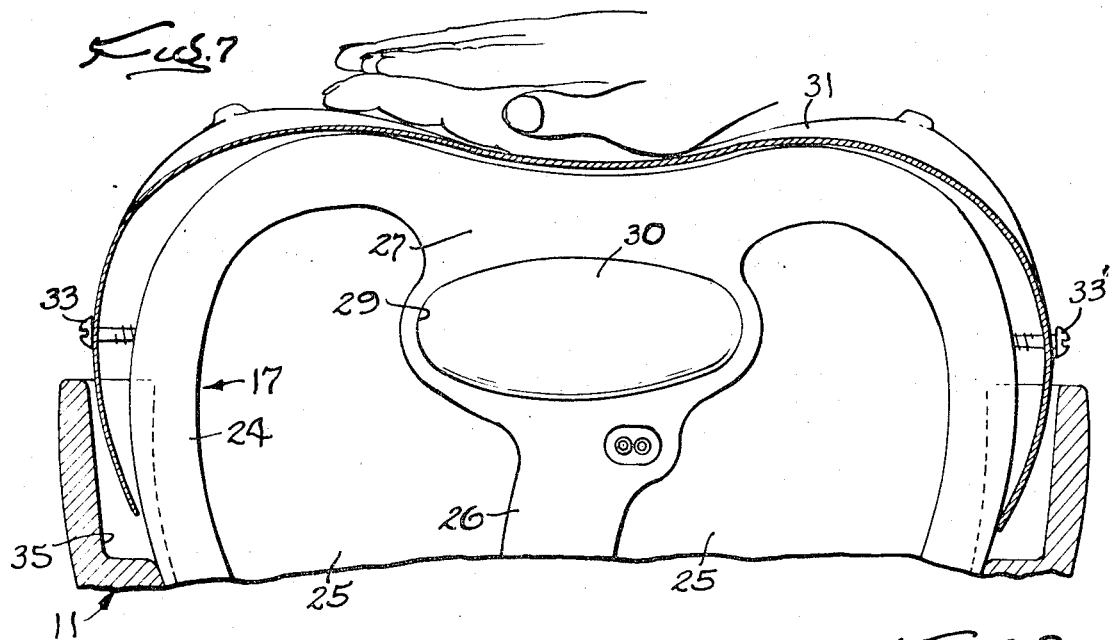
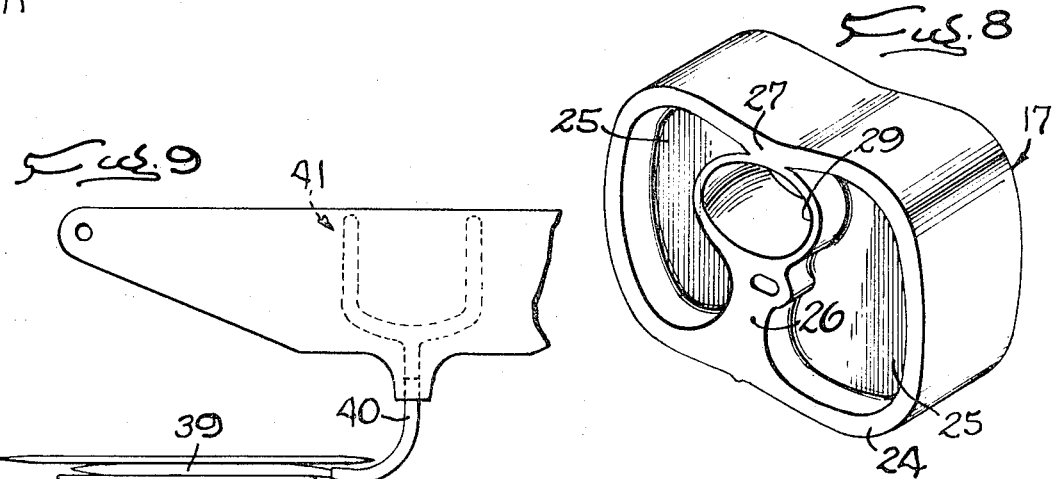
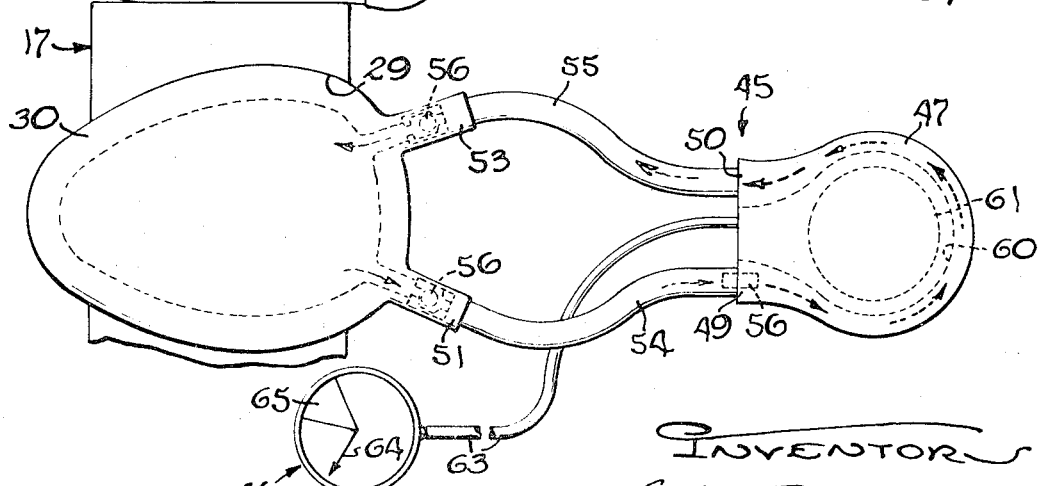

United States Patent Office 3,562,925
Patented Feb. 16, 1971

3,562,925
TRAINING MANIKIN FOR TEACHING AND PRACTICING EXTERNAL CARDIAC COMPRESSION
Walter P. Baermann and Vincent M. Foote, Raleigh, N.C., assignors to Medical Supply Company, Rockford, Ill., a corporation of Missouri
Filed Mar. 3, 1969, Ser. No. 803,608
Int. Cl. G09b 23/28
U.S. Cl. 35—17                    9 Claims

ABSTRACT OF THE DISCLOSURE

The manikin comprises a simulated human torso with a chest cavity in which is located an anatomically correct thorax unit covered by a human-shaped chest plate and adapted to be compressed externally to pump blood-like liquid from a simulated heart into a simulated circulatory system.

BACKGROUND OF THE INVENTION

This invention relates to a training device for use in teaching and practicing the principles of external cardiac compression. More particularly, the invention relates to a training manikin which simulates a human body so as to provide trainees with an opportunity to practice and thus become proficient in the technique of external cardiac compression. One type of training manikin which is used for these general purposes is disclosed in U.S. Pat. No. 3,276,147.

SUMMARY OF THE INVENTION

The primary aim of the present invention is to provide a new and improved training manikin of the above character which, when compared with prior manikins, is more natural and life-like in appearance, in feel, and in physical resistance under the application of external cardiac compression. In large, these ends are achieved through the provision in the manikin of a simulated but extremely realistic torso within which is physically located a thorax unit with a simulated human heart. The thorax unit is an anatomically correct replica of a human thorax and is constructed in such a manner as to provide compressive resistance identical to that of the human chest so that the trainee can learn to apply the proper amount of pressure to the chest to restore heart circulation. A simulated chest plate corresponding in size and shape to the human chest overlies the thorax unit and helps the trainee locate by touch the proper body area upon which to apply compression to massage the heart correctly.

Another object of the invention is to provide a novel and comparatively simple and versatile simulated circulatory system adapted for use with the thorax unit to receive blood-like liquid pumped from the heart, the circulatory system being characterized both by its ability to enable the trainee to view the circulation and by its ability to selectively operate a gage for indicating the degree of pressure applied to the thorax unit.

The invention also resides in the unique construction of the torso, the thorax unit and the circulatory system to enhance the realism of the manikin.

Other objects and advantages of the invention will become apparent from the following detailed description when taken in conjunction with the accompanying drawings.

BRIEF DESCRIPTION OF THE DRAWINGS

FIG. 1 is a fragmentary perspective view of a new and improved training manikin embodying the novel features of the present invention.

FIG. 2 is a fragmentary cross-section taken substantially along the line 2—2 of FIG. 1.

FIG. 3 is an enlarged sectional view of part of the circulatory system of the manikin shown in FIG. 2.

FIG. 4 is a fragmentary cross-section taken substantially along the line 4—4 of FIG. 3.

FIG. 5 is an enlarged cross-section taken substantially along the line 5—5 of FIG. 2.

FIG. 6 is a fragmentary cross-section taken substantially along the line 6—6 of FIG. 5.

FIG. 7 is a fragmentary view similar to FIG. 5 but showing external compression being applied to the thorax unit.

FIG. 8 is a perspective view of the thorax unit shown in FIG. 1.

FIG. 9 is an enlarged plan view of the heart and circulatory system shown in FIGS. 1 and 2.

DETAILED DESCRIPTION OF THE PREFERRED EMBODIMENT

As shown in the drawings for purposes of illustration, the invention is embodied in a training manikin 10 which is particularly adapted for use in teaching and practicing the principles of external cardiac compression (ECC). It is well known that ECC, otherwise known as closed chest cardiac massage, is an effective method of keeping an inert human heart pumping blood for an extended period of time. In massaging the heart externally, the rescuer places the heel of one of his hands on the lower part of the victim's sternum and places his other hand over the first while alternately pressing downwardly on the sternum and then relieving the pressure. The chest thus may be compressed to squeeze the heart between the sternum and the spinal column and to force the blood out of the heart ventricles. When the pressure is released, the chest re-expands and the heart refills with blood. It is essential that the rescuer be thoroughly trained and experienced in the techniques of ECC since improper placement of the hands or the application of excessive pressure can result in fracturing of the ribs, laceration of the liver or regurgitation of the stomach contents into air passages. To aid in the teaching and practicing of the principles of ECC, various types of training manikins have been proposed and are used to enable trainees to learn the proper techniques.

In its primary aspect, the present invention contemplates a new and improved training manikin 10 which serves as a more effective visual aid in teaching the principles of ECC and which, at the same time, is capable of providing the trainee with a more realistic notion as to the proper place to apply compression and as to the correct force required to restore circulation. With the present manikin, the trainee is able to learn more easily the fundamentals of ECC and is able to practice under conditions which more nearly simulate those encountered when treating an actual human casualty.

More particularly and as shown in FIGS. 1 and 2, the manikin 10 comprises a torso 11 which is molded of relatively rigid flesh-colored plastic and which is sized and shaped almost exactly the same as the torso of a young woman. Attached to the torso are permanently shaped arms 13 and legs 14 and also a life-like head 15 with a neck 16.

In carrying out the invention, an anatomically correct thorax unit 17 is located in a chest cavity 19 (FIG. 2) within the torso 11 itself and is constructed to resist compression to the same degree as a human thorax. As shown most clearly in FIGS. 2, 5 and 6, the chest cavity is defined by a rigid back 20 of the torso, by opposed top and bottom walls 21, and by opposed side walls 23. The thorax unit is a one-piece molding of resiliently compressive material such as vinyl plastic and is of the same cross-section as a human thorax. In general, the thorax unit is formed with an enlarged annular flange 24 (FIG. 8) which is connected by relatively thin webs 25 of vinyl to a simulated spinal column 26 and a simulated sternum 27. The lower or back part of the flange is fitted removably into the cavity between the top and bottom walls 21 (see FIG. 6), and such walls, together with the side walls 23, restrict bodily movement of the thorax unit within the chest cavity.

Located between the spinal column 26 and the sternum 27 and extending through the thorax unit 17 is an opening 29 (FIG. 8) for receiving a flexible bulb 30 (FIG. 2) which simulates a human heart in appearance, in size and in compressive resistance. When external compression is alternately applied to and removed from the thorax unit, the sternum is flexed toward and away from the spinal column as shown in FIGS. 7 and 5, respectively, to squeeze and release the heart 30 in the same manner as a human heart undergoing ECC. With the thorax unit being made of vinyl and being constructed as shown, approximately 80 pounds of force must be applied to the sternum to flex the latter through a distance of 1½ to 2 inches. The thorax unit thus provides the same resistance to compression as a human thorax.

To enhance the realism of the manikin 10 and to enable the trainee to learn how to locate his hands properly on the thorax unit 17 to apply compression, a chest plate 31 (FIGS. 1, 2 and 5) is advantageously located over the thorax unit and is sized and shaped to look and feel similar to a human chest. The chest plate is connected along its sides to the thorax unit by screws 33 (FIG. 5) and is formed of transparent plastic so that the trainee may view the heart 30 and the motion undertaken by the thorax unit as compression is applied. The chest plate merges smoothly with the neck 16 and with a front stomach portion 34 (FIG. 2) of the torso 11 to realistically simulate the front of a human. With the chest plate being shaped like a human chest, the trainee, by vision and by sense of touch, may learn how to find the lower part of the sternum 27 and to correctly position his hands to apply compression to the heart. When compression is applied, the chest plate is deflected downwardly relative to the neck and the stomach and is partially received within recesses 35 formed in the upper sides of the torso 11 (see FIG. 5).

As shown in FIG. 1, the manikin 10 is dressed in a uniform 36 with a front flap 37 which can be opened away from the chest to expose the thorax unit 17 and the chest plate 31. By closing the flap and covering the chest plate, the instructor can force the trainee to locate his hands properly on the chest plate solely by the sense of touch and without being able to see the chest plate and the heart 30.

Located between the thorax unit 17 and the chest plate 31 is a flexible sac 39 (FIG. 9) which is connected by a line 40 to a simulated cartoid artery unit 41 that may be strapped around the neck 16 of the manikin 10. When the chest plate 31 is deflected downwardly, the sac 39 is compressed to force a pulse of air through the line and into the artery unit. The trainee can detect and feel the pulse in the artery unit when ECC is being properly executed.

From the foregoing, it will be apparent that the present invention brings to the art a new and improved training manikin 10 in which an anatomically correct thorax unit 17 is located in the torso 11 of the manikin itself so as to enable the teaching and practicing of the techniques of ECC on a life-like replica of a human. In addition to being very realistic in appearance, the manikin is shaped to feel like a human and is constructed to resist compression much like a human body.

According to another aspect of the invention, a novel simulated circulatory system 45 (FIGS. 4 and 9) is connected to receive blood-like liquid from the heart 30 as the latter is compressed, and is arranged not only to enable the flow of blood to be seen visually but also to actuate a gage 46 (FIGS. 1 and 9) which helps the instructor determine the trainee's proficiency in ECC. As shown in FIG. 4, the circulatory system includes an outer container in the form of a sealed sac 47 which is made of transparent plastic. The sac is located within the chest cavity 19 adjacent the neck 16 and is formed with an inlet 49 (FIG. 9) and an outlet 50 which are connected to a simulated aorta 51 and vena cava 53, respectively, of the heart 30 by transparent conduits 54 and 55. Each time the heart is compressed and released, a surge of liquid which preferably is blood-like in color is pumped from the heart through the conduit 54 and into the sac 47 and then is returned to the heart through the conduit 55. The trainee may watch the liquid circulate through the sac and the conduits and thus may see the results of performing cardiac compression in a proper manner. One-way valves 56 are located at the inlet 49 of the sac and at the aorta and vena cava of the heart to prevent reverse circulation of the liquid.

To operate the gage 46, a sealed inner container or sac 60 (FIG. 4) defining an air chamber is disposed within the outer sac 47 and transmits a pneumatic pressure signal to the gage in response to each surge of liquid through the outer sac. The inner sac is made of flexible plastic and is spaced inwardly from the walls of the outer sac as shown in FIG. 4 so as to leave a flow passage for the liquid between the two sacs.

As the heart 30 is compressed, liquid flowing into the outer sac 47 contracts the inner sac 60 to compress the air therein and also to compress a resiliently flexible sponge-like element 61 (FIG. 4) which is disposed within the inner sac. When the pressure on the heart is relieved, the sponge expands to return the inner sac to its normal expanded condition. The inner sac communicates with the gage 46 through a line 63 and, when the air in the sac is compressed, an indicating needle 64 (FIG. 9) of the gage is deflected across a dial 65 through a distance approximately proportional to the pressure exerted on the thorax unit 17 to compress the heart. As a result, the instructor and the trainee can determine if the trainee is applying pressure within such a range as to restore circulation to the heart but without causing injury to the victim. The dial preferably is color-calibrated to indicate a correct pressure range. If it is not desired to use the gage, the latter may be disconnected from the line 63, and the line may be sealed by a plug 66 as shown in FIG. 4.

It will be apparent that the circulatory system 45 of the present invention enables viewing of the circulatory flow and also is capable of actuating the gage 46 to give an indication of the pressure applied to the heart 30. Since the pressure is sensed within the circulatory system itself as the inner sac 60 pulsates, a more accurate reading as to the trainee's proficiency is given. Although the gage is responsive to the circulation of the liquid, the liquid itself flows within a closed circuit and need not be transmitted to the gage.

If desired, the thorax unit 17 with the heart 30 and the circulatory system 45 may be removed as a unitary assembly from the chest cavity 19 in the torso 11 for explanatory and demonstration purposes. Also, the heart may be removed from the opening 29 in the thorax unit and, together with the circulatory system, may be passed among the trainees so the trainees may gain a better idea as to the size, shape and resistance of the heart.

We claim as our invention:

1. A training manikin for use in teaching and practicing the principles of external cardiac compression, said manikin comprising a simulated human torso having a chest cavity, said cavity opening out of the front of said torso and being defined by a relatively rigid back and by opposed top and bottom walls and opposed side walls, a simulated thorax unit fitted removably into said cavity against said back and between said walls and being restricted against movement within the cavity by the walls, said thorax unit being made of resiliently compressible material and having the same general cross-section as a human thorax, an opening in said thorax unit between the location of the sternum and the spine, a compressible bulb simulating a heart disposed in said opening and adapted to transmit fluid pulses in response to compressive forces being alternately applied to and removed from said thorax unit, and a chest plate overlying the front of said thorax unit and sized and shaped to conform generally to the human chest whereby a trainee may feel said chest plate and properly locate his hands to apply compression to said thorax unit and said heart.

2. A training manikin as defined in claim 1 in which said chest plate is transparent whereby the thorax unit and the heart may be seen through the chest plate.

3. A training manikin as defined in claim 1 wherein said torso is dressed in a uniform which covers and conceals said chest plate, the front of said uniform being adapted for opening whereby the chest plate may be selectively exposed.

4. A training manikin as defined in claim 1 wherein said torso includes front neck and stomach portions which form continuations of said chest plate to simulate the front of a human body, said chest plate being separate from said neck and stomach portions and being capable of being depressed inwardly relative to said portions.

5. A training manikin as defined in claim 1 further including a simulated circulatory system located within said cavity and connected to said heart to receive fluid pumped from the heart, said system comprising a transparent outer sealed container having an inlet and an outlet, transparent lines conecting said inlet and outlet to said heart whereby fluid pumped from the heart may flow through said container and back to the heart and may be seen during such flow, a flexible inner container disposed within and sealed relative to said outer container and adapted to be contracted and expanded as fluid flows into and out of said outer container, and a pressure gage communicating with the interior of said inner container and responsive to contraction and expansion of the latter to indicate changes in the flow of the fluid.

6. A device for use in teaching and practicing the principles of external cardiac compression, said device comprising a simulated thorax unit made of resiliently compressible material and having the same general cross-section as a human thorax, an opening in said thorax unit between the location of the sternum and the spine, a compressible bulb simulating a heart disposed in said opening and adapted to pump liquid in response to compressive forces being alternately applied to and removed from said thorax unit, a simulated circulatory system connected to said heart to receive liquid pumped from the heart, said system comprising an outer sealed container made of transparent material and having an inlet and an outlet, transparent lines connecting said inlet and outlet to said heart whereby liquid pumped from the heart may flow through said container and back to the heart and may be seen during such flow, an inner chamber disposed within and sealed relative to said container and adapted to be contracted and expanded as liquid is pumped into and out of said container, and a pressure gage communicating with said chamber and responsive to contraction and expansion of the latter to indicate changes in the flow of the liquid.

7. A device as defined in claim 6 in which said chamber is defined by a sac disposed within said container and made of flexible material.

8. A device as defined in claim 7 further including a resiliently yieldable element disposed within said sac and operable to expand the latter when liquid flows out of said container.

9. A device as defined in claim 7 further including a conduit establishing fluid communication between said sac and said gage.

References Cited
UNITED STATES PATENTS
3,209,469   10/1965   James _____ 35—17

HARLAND S. SKOGQUIST, Primary Examiner